US 9,429,455 B2

(12) United States Patent
Heiligenstein et al.

(10) Patent No.: US 9,429,455 B2
(45) Date of Patent: Aug. 30, 2016

(54) POWERING SENSORS IN A HEAT TRACE SYSTEM

(71) Applicant: Chromalox, Inc., Pittsburgh, PA (US)

(72) Inventors: Adam Heiligenstein, Pittsburgh, PA (US); Scott Treser, Pittsburgh, PA (US); Thomas Robinson, La Vergne, TN (US)

(73) Assignee: CHROMALOX, INC., Pittsburgh, PA (US)

( * ) Notice: Subject to any disclaimer, the term of this patent is extended or adjusted under 35 U.S.C. 154(b) by 0 days.

(21) Appl. No.: 14/905,521

(22) PCT Filed: Aug. 4, 2014

(86) PCT No.: PCT/US2014/049591
§ 371 (c)(1),
(2) Date: Jan. 15, 2016

(87) PCT Pub. No.: WO2015/023462
PCT Pub. Date: Feb. 19, 2015

(65) Prior Publication Data
US 2016/0161316 A1 Jun. 9, 2016

Related U.S. Application Data

(60) Provisional application No. 61/865,851, filed on Aug. 14, 2013.

(51) Int. Cl.
*G01K 1/00* (2006.01)
*G01K 7/00* (2006.01)
*G01F 1/704* (2006.01)
*H05B 1/02* (2006.01)
*F16L 53/00* (2006.01)

(52) U.S. Cl.
CPC .......... *G01F 1/7044* (2013.01); *F16L 53/008* (2013.01); *H05B 1/0244* (2013.01)

(58) Field of Classification Search
USPC .............. 374/166, 141, 147, 148, 208, 183; 340/540
See application file for complete search history.

(56) References Cited

U.S. PATENT DOCUMENTS

| 4,751,495 A | 6/1988 | Whitman |
| 5,475,384 A | 12/1995 | Manenti et al. |
| 2011/0163082 A1 | 7/2011 | Mullen |
| 2011/0320048 A1* | 12/2011 | Kim .................. H04Q 9/00 700/282 |
| 2014/0190680 A1* | 7/2014 | Vanthournout ..... F24D 19/1063 165/287 |

OTHER PUBLICATIONS

International Search Report for International Application No. PCT/US14/049591 issued Nov. 13, 2014.
(Continued)

*Primary Examiner* — Mirellys Jagan
(74) *Attorney, Agent, or Firm* — K&L Gates LLP (57) ABSTRACT

Powering a sensor module of a heat trace system used for heating vessels. The sensor module may comprise a temperature sensor that measures the temperature of a vessel. A microprocessor-based controller of the heat trace system uses the sensed temperature from the sensor module to control the voltage applied to the heat trace, and thereby control the heat provided by the heat trace to the vessel. The sensor module may comprise an energy storage device that stored energy from the voltage difference across a pair of buss wires in the heat trace cable, and the stored energy is used to power the components of the sensor modules.

22 Claims, 5 Drawing Sheets

(56) References Cited

OTHER PUBLICATIONS

Written Opinion of the International Searching Authority for International Application No. PCT/US14/049591 issued Nov. 13, 2014.

Written Opinion of the International Preliminary Examining Authority for International Application No. PCT/US14/049591 issued Aug. 21, 2015.

* cited by examiner

POWERING SENSORS IN A HEAT TRACE SYSTEM

PRIORITY CLAIM

The present application is a United State national stage application, filed under 35 U.S.C. §371, of PCT/US2014/049591, which was filed on Aug. 4, 2014, and which claims priority to U.S. provisional application Ser. No. 61/865,851, filed Aug. 14, 2013, with the same title as above, both of which are hereby incorporated herein by reference in their entirety.

BACKGROUND

Heat trace systems are commonly used in industrial and commercial settings to maintain or raise the temperature of pipes through an electrical heating element or heat trace that is in physical contact with the pipe to be heated. Most heat trace systems are controlled by a temperature control system. Such systems include temperature sensors throughout the piping system, and based on the detected temperatures by the sensors, the central computer system controls the current to the various heating elements, to thereby control the trace heating of the various pipes or tanks in the system.

While wireless sensors have gained acceptance in many industries, they have not gained much acceptance in heat trace systems because there is no suitable way to power the wireless sensors. Batteries are not preferred in heat trace systems because a battery failure could result in catastrophic failure (such as when a frozen pipe bursts when a wireless sensor with a spent battery is unable to detect the decreasing temperature of the pipe). Also, running power cables to the sensors is expensive and defeats the purpose of having a wireless sensor.

SUMMARY

In one general aspect, the present invention is directed to powering a sensor module of a heat trace system used for heating pipes or tanks in a piping system or installation. The sensor module may comprise a temperature sensor that measures the temperature of a pipe or tank section and a transmitter that transmits the sensed temperature to a microprocessor-based controller of the heat trace system via a wireless or wired data link. The controller uses the sensed temperature from the sensor module to control the voltage applied to the heat trace, and thereby control the heat provided by the heat trace to the pipe or tank section. In particular, in various embodiments, the sensor module is powered by an energy storage device that stores energy from the voltage difference across a pair of buss wires in the heat trace cable. In various embodiments, the controller is programmed to control the voltage applied to the heat trace cable to momentarily power up the sensor module at times when the energy storage device is running low. Powering the sensor module with the heat trace cable obviates the need for batteries for the transmitter, and obviates the need to use separate power lines (separate from the heat trace cables) to power the sensor module.

These and other benefits of the present invention will be apparent from the description that follows.

FIGURES

Various embodiments of the present invention are described herein by way of example in conjunction with the following figures, wherein.

DESCRIPTION

Figure 1:
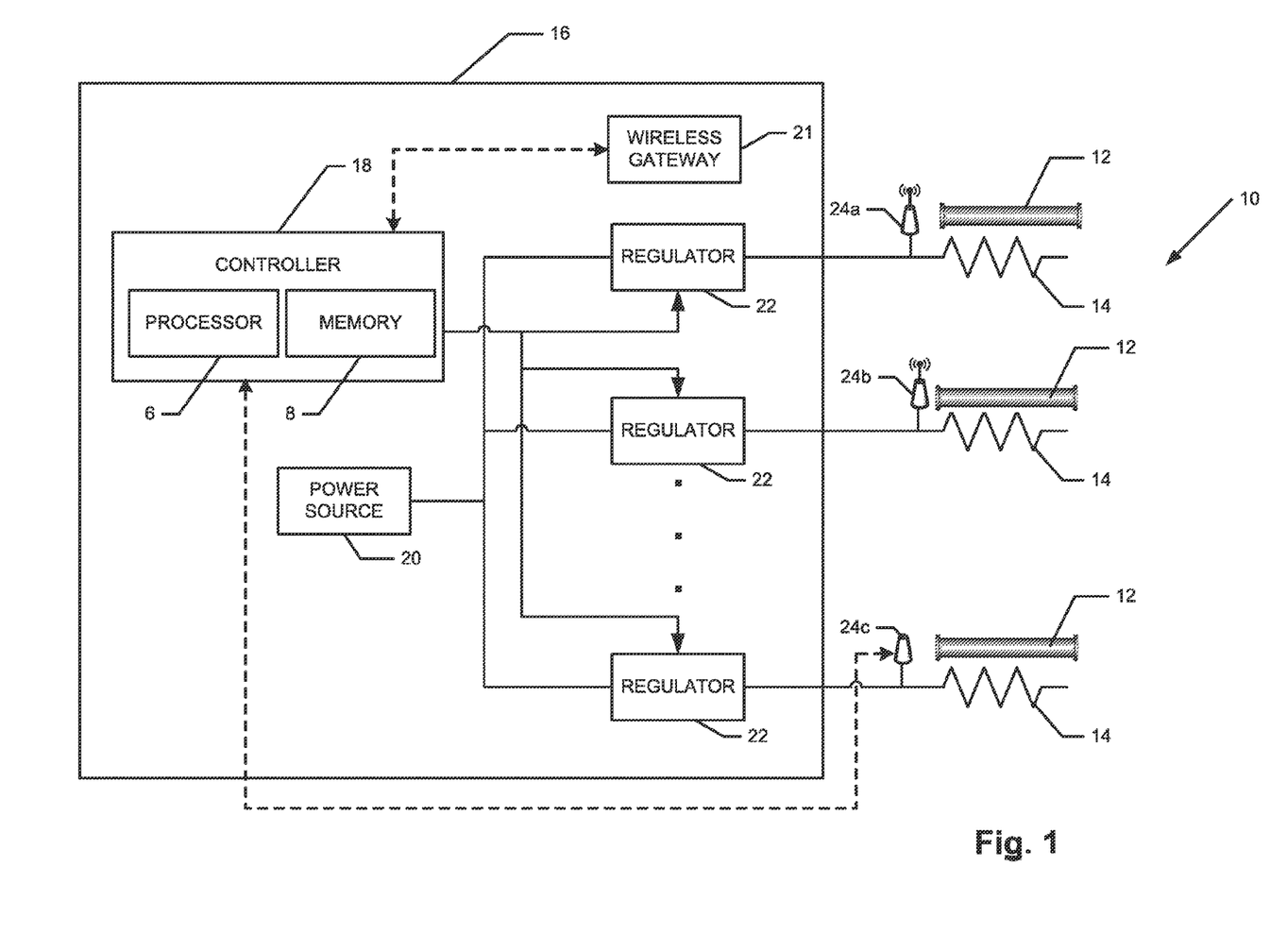
FIG. 1 is a simplified block diagram of a heat trace system according to various embodiments of the present invention.

The present invention is directed generally to systems and methods for powering sensors, such as temperature sensors, in a heat trace system. Heat traces are used to heat pipes or tanks (collectively referred to herein sometimes as "vessels") in a piping system that carries fluids. In the description that follows, the heat trace system is described as being used for pipes, although it should also be recognized that it could be used for other types of liquid-carrying or -containing vessels, such as tanks, etc. FIG. 1 is a simplified block diagram of a heat trace system 10 according to various embodiments of the present invention. For the sake of simplicity, FIG. 1 shows only three sections of pipe 12 of the piping system, each proximate to a heat trace 14 for heating its associated pipe section 12. Of course, in an industrial setting, there are likely to be many more sections of pipe that need heated. More details regarding the heat traces 14, which are shown schematically in FIG. 1 as resistors, are provided below in connection with FIGS. 2 through 5. In particular, as described below, the heat traces 14 are preferably in contact with the pipe sections 12, and covered with insulation. The heat traces 14 are preferably electrical heating elements that heat the pipe sections 12 when conducting electrical current. Heat generated by the heat traces 14 is for maintaining the temperature of the pipe 12. Trace heating may be used to protect pipes from freezing, to maintain a constant flow temperature in hot water systems, or to maintain process temperatures for piping that must transport substances that solidify at ambient temperatures.

As shown in FIG. 1, the heat trace system 10 may include a central or distributed microprocessor-based temperature control system 16. The temperature control system 16 may comprise, among other things, a controller and a power source 20. The controller 18 may be implemented as a smart, microprocessor-based, computer device that, through programming, controls the operation of the heat trace system 10. In that connection, the controller 18 may comprise at least one microprocessor 6 and at least one semiconductor memory unit 8. The memory unit 8 stores instructions, e.g., software or firmware, that is executed by the processor 6. In particular, the controller 18 controls individually the current supplied to the various heat traces 14 through individual loops—one loop for each heat trace 14—to thereby control the heating of the pipes 12 in the piping system. The power source 20 may include AC mains power, e.g., 100-480 VAC three phase. The power source 20 is connected to the heat traces 14 via regulators 22 on each loop. The regulators 22 control the voltage from the power source 20 applied to each loop. In various embodiments, the regulators 22 comprise silicon-controlled rectifiers (SCRs). The controller 18 controls the duty cycles of the SCRs to thereby control the voltage applied to its associated heat trace 14.

As shown in FIG. 1, the heat trace system 10 also includes a number of sensor modules 24*a-c*. The sensor modules 24*a-c* may be distributed throughout the piping system and include a temperature sensor for sensing the temperature of various pipe sections 12 in the piping system. The sensor modules 24*a-c* preferably include a resistance temperature detector (RTD). The sensed temperature is reported back by the sensor modules 24*a-c* to the controller 18 of the temperature control system 16. The controller 18 is programmed to compare the sensed temperatures to desired, set point temperatures (which may be, and usually are, different for different pipe sections 12), and control the duty cycles of the SCRs in the regulators 22 based on the comparisons. Chromalox Inc.'s intelliTRACE® ITLS panel is an example of a suitable temperature control system 16. It may include (in addition to the processor 6 and semiconductor memory 8) a touch-screen user interface that allows a user to easily program the temperature control system 16 to the desired heat levels for each heat trace 14 being controlled by the temperature control system 16.

In FIG. 1, two of the sensor modules 24*a-b* are shown as wireless sensors that communicate wirelessly with the temperature control system 16 via, for example, a self-organizing, self-healing wireless mesh network. The wireless mesh network could be based on the IEEE 802.11 standard, the IEEE 802.15.4 standard, or the ISA-100.11a standard, for example. The control system 16 may include a wireless gateway 21 to receive the communications from the wireless sensor modules 24*a-b* in such an embodiment. The wireless gateway may be, for example, a WirelessHART Gateway from Pepperl+Fuchs. In other embodiments, some or all of the sensor modules 24 may have a wired data connection to the temperature control system 16, such as sensor module 24*c* illustrated in FIG. 1. The wired connection may be, for example, an Ethernet connection or twisted pair cables An important aspect of the present invention, however, is that the sensor modules 24*a-c* are powered by the heat traces themselves, thereby obviating the need for batteries or separate power lines for the sensor modules 24*a-c*. This aspect is described in more detail below.

Figure 2:
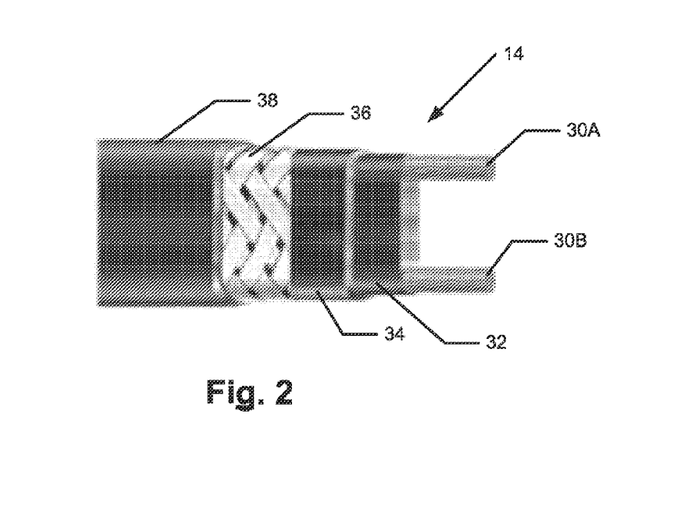
FIG. 2 illustrates aspects of a heat trace cable according to various embodiments of the present invention.
Figure 3:
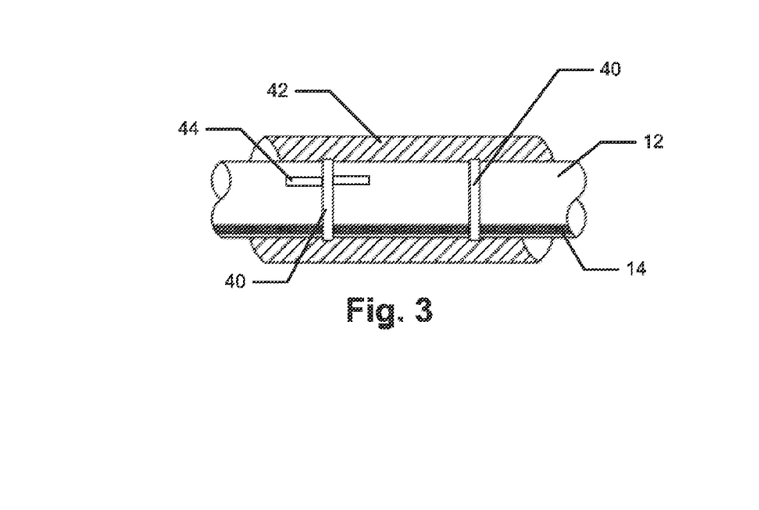
FIGS. 3 and 4 are side views of a pipe section with a heat trace according to various embodiments of the present invention.
Figure 4:
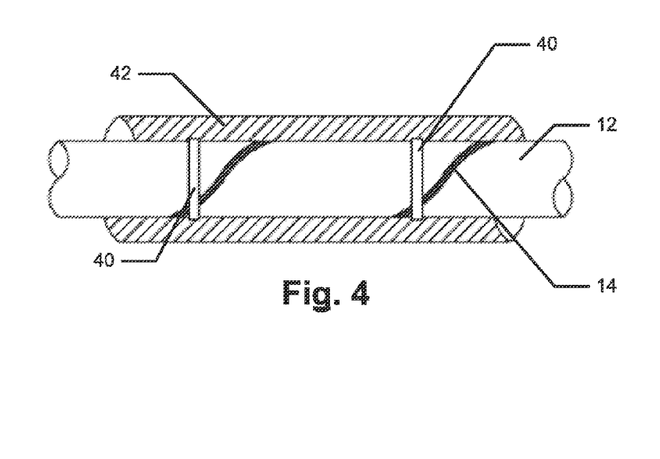
Figure 5:
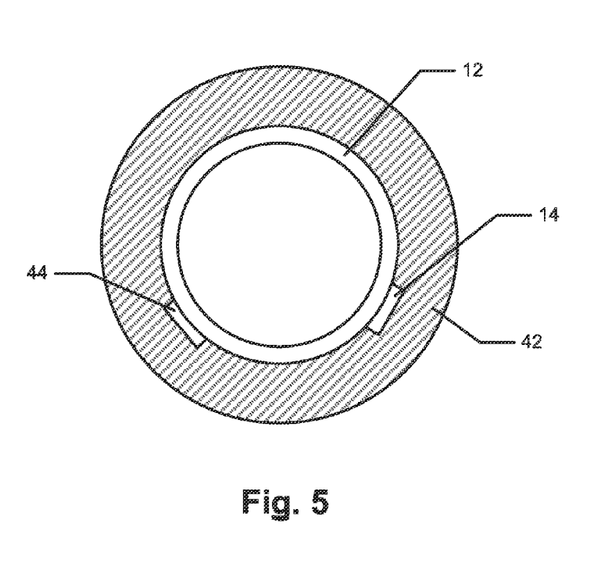
FIG. 5 is a cross-sectional view of a pipe section with a heat trace according to various embodiments of the present invention.

FIG. 2 is a diagram of a heat trace 14 that shows, in a cut-away view, its various layers according to various embodiments of the present invention. The heat trace 14 includes two buss wires 30A, B surrounded by a conductive matrix 32 (which is preferable polymeric). The conductive matrix 32 in turn may be surrounded a jacket 34, which may be surrounded by a metallic (e.g., tinned copper) braid 36 and an overcoat over braid 38 (preferably Teflon). The buss wires 30A, 30B carry electrical current from the power source 20, and the heat from the heat trace 14 heats the pipe 12 that it contacts to offset any losses in the pipe temperature. FIGS. 3-5 show that the heat trace 14 is preferably placed in contact with the outside of the pipe section 14. FIG. 3 shows an embodiment where the heat trace 14 runs straight along the pipe 14 and FIG. 4 shows an embodiment where the heat trace 14 is spirally wound around the pipe 12. The heat trace 14 may be held in place against the pipe 14 by a fastener 40, such as fiberglass tape or banding. Further, the heat trace 14 and pipe 12 are preferably surrounded by thermal insulation 42. FIG. 5 illustrates an exemplary cross-section view of the pipe 12. This figure shows that both the heat trace 14 and the temperature sensor 44 (e.g., RTD) of the sensor module 24 are located on the outside of the pipe 12. Preferably, the heat trace 14 and RTD 44 are at the lower portion of the pipe 12. In other applications, multiple heat traces 14 could be used for one pipe 12, in which case both heat traces 14 are preferably toward the bottom (e.g., at 4 and 8 o'clock position), and the RTD 44 is toward the top of the pipe 12 (e.g., at the 2 o'clock position). FIG. 3 shows an embodiment where a RTD 44 is banded to the pipe 12 toward the top of the pipe 12.

Figure 6:
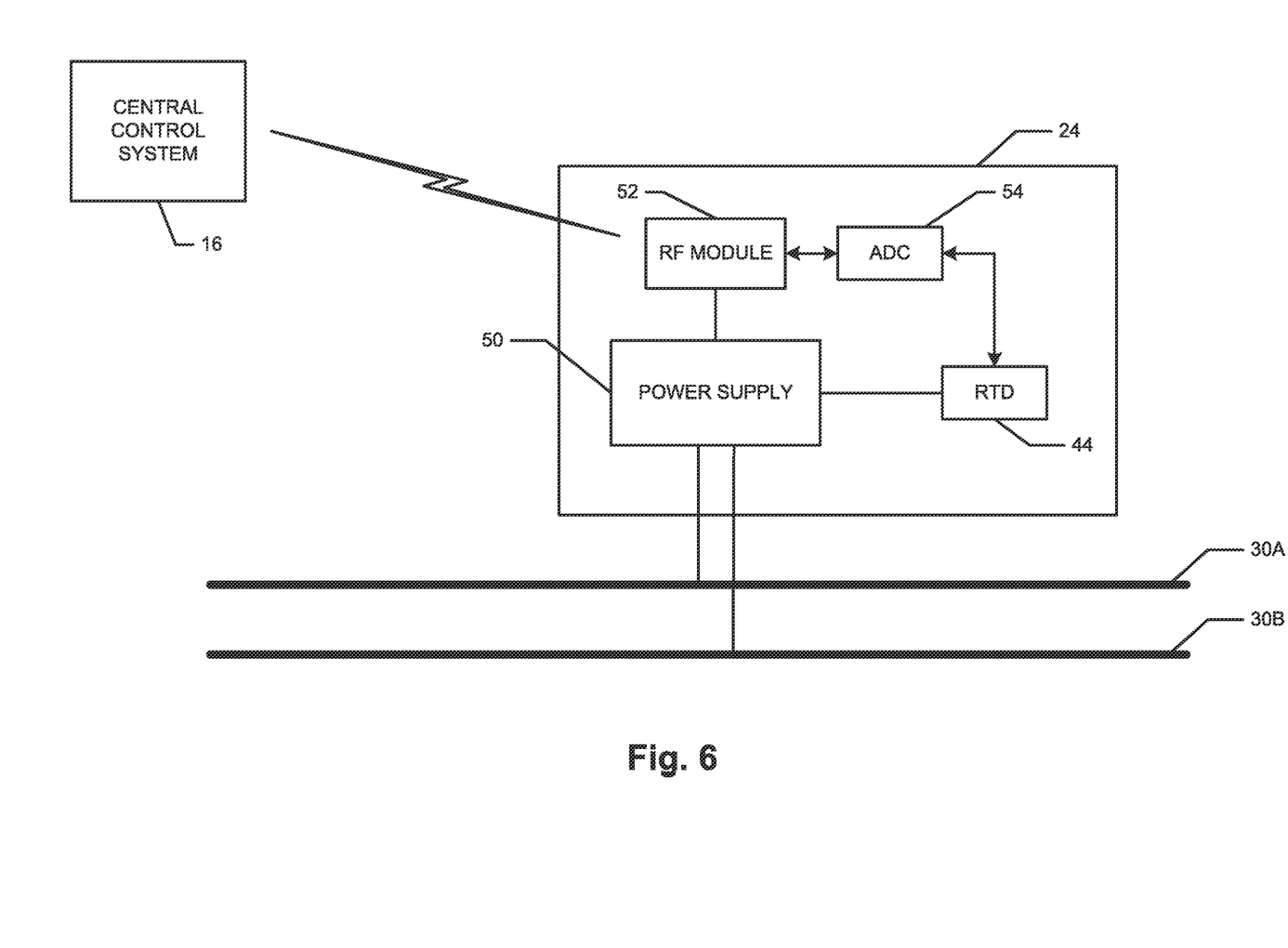
FIG. 6 is a block diagram of a sensor module according to various embodiments of the present invention.

As mentioned above, the sensor modules 24 are powered with electrical current in the heat traces 14. FIG. 6 is a simplified block diagram of a sensor module 24 according to various embodiments of the present invention. As shown in FIG. 6, the sensor module 24 may be powered electrically by the voltage difference across the buss wires 30A,B of the heat trace 14 (e.g., a 120V or 240V difference, based on the power source 20). As such, the sensor module 24 may be spliced to the heat trace 14 at a desired location along the heat trace 14. The sensor module 24, as shown in FIG. 6, may include a power supply 50 for converting the voltage from the buss wires 30A,B to desired voltage levels for powering the temperature sensor (RTD) 44 and an a RF communication module 52. The sensor module 24 may also include a microcontroller as described further below in connection with FIG. 8.

The RTD 44 senses the temperature at a localized point of the pipe (see FIGS. 3-5). The sensed temperature is sent, via an analog-to-digital converter (ADC) 54, to the RF communication module 52, which transmits the temperature data wirelessly to the temperature control system 16 via the wireless network. The RF communication module 52 manages the RF communications between the sensor module 24 and the temperature control system 16, and may be implemented with, for example, an application specific integrated circuit (ASIC). In other embodiments, some or all of the sensor modules 24 have a wired data connection to the temperature control system 16, such as via Ethernet cables (not shown). By powering the sensor module 24 with the heat trace 14, there is no need for batteries to power the sensor modules 24 and it obviates the need for separate power lines (separate from the heat traces 14) for supplying power to the sensor modules 24 (which would defeat the purpose of the wireless sensors). One problematic issue, however, with powering the sensor modules 24 with the heat traces 14 is that at times one or more heat traces 14 in the installation may carry no or insufficient current to power the sensor modules 24 (for example, if there associated tank or pipe does not currently require heating). In typical installations, the temperature control system 16 queries the various sensor modules 24 for their temperature reading, and based on that reading, controls the heat trace voltage and hence temperature. The temperature control system 16 can also logically compare readings from multiple sensors 24 on one line by using Boolean logic to decide whether to turn the heat traces 14 on the line on or off.

In order to overcome this problem, in various embodiments the power supply 50 of the sensor module 24 comprises an energy storage device, such as a supercapacitor (sometimes referred to as an "ultracapacitor"), for storing energy from the voltage difference across the buss wires of the heat trace 14 (when there is a voltage difference). That stored energy may be used to power the various components of the sensor module 24 even when there is no current in the heat trace 14. The sensor modules 24 can periodically report the charge level of the energy storage device back to the controller 18 so that the controller 18 can momentarily supply current to the heat trace 14 to thereby recharge the energy storage device of the power supply 50.

Figure 8:
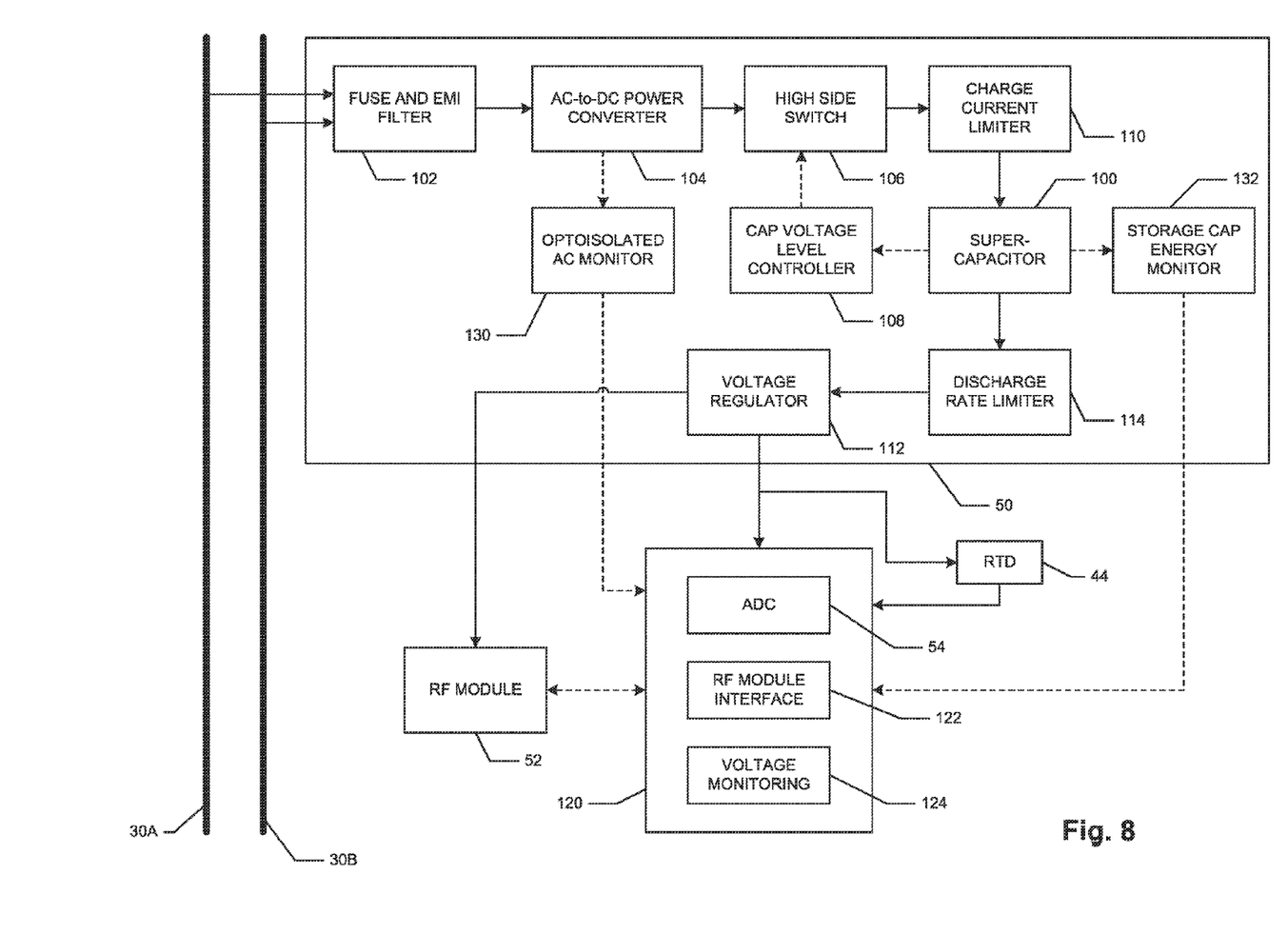
FIG. 8 is a block diagram of a sensor module according to various embodiments of the present invention.

FIG. 8 is a block diagram of a sensor module 24 according to an embodiment that uses a supercapacitor 100 as the energy storage device. The supercapacitor 100 may have a relatively large capacitance, such as 25 F with a full charge capacity/rating of 2.5 VDC, for example. In FIG. 8, power flow is indicated by solid lines (with arrows) and sensing or control lines between components are indicated by dashed lines (with arrows). As shown in FIG. 8, the power supply 50 may comprise a fuse and EMI filter 102 connected to the buss wires 30 AB of the heat trace 14. An isolated AC-DC power converter converts the AC voltage from the heat trace 14 (after EMI filtering) to DC. A high-side switch 106 may be controlled by a capacitor voltage level controller 108 to conduct charging current to the supercapacitor 100 when the voltage across the capacitor is less than its maximum voltage rating (e.g., 2.5 V). Further, a charge current limiter 110 may limit the charge current supplied to the supercapacitor 100, such as to 100 mA, for example. In various embodiments, the high-side switch 106 and the charge current limiter 110 may be combined in a single suitable power management switch. The capacitor voltage level controller 108 may be implemented as a CMOS op amp connected as a comparator, for example, whose output disables the high-side switch 106 above the maximum voltage (e.g., 2.5 VDC) and enables (turns on) the high-side switch 106 at a lower voltage (e.g., 2.4 VDC).

Discharge current from the supercapacitor 100 is supplied to a voltage regulator 112 via a discharge rate limiter 114, which limits the discharge of the supercapacitor 100 to, for example, 10 to 20 mA. The voltage regulator 112 may provide a regulated output voltage (e.g., 3.3 Vout) to the RF module 52 (if there is one), a microcontroller 120, and the sensor (e.g., RTD) 44 (or the sensor 44 could be powered indirectly by the microcontroller 120). The microcontroller 120 may comprise, in various embodiments, the ADC 54 (see FIG. 6), an interface 122 for communicating with the RF module 52, and a voltage monitor module 124 for monitoring operation of the power supply 50. For example, as shown in FIG. 8, the power supply may comprise an optoisolated AC monitor 130 that allows the microcontroller 120 (via the voltage monitor module 124) to monitor whether there is AC voltage from the heat trace 14. Also, the power supply 50 may comprise a monitor 132 that monitors the voltage across the supercapacitor 100. Based on input from the monitor 132, the microcontroller 120 (via the voltage monitor module 124) can estimate the energy remaining in the supercapacitor 100 and predict how much operating time remains on the supercapacitor 100. The microcontroller 120 can transmit periodically (e.g., every minute) data about the status of the supercapacitor 100 to the controller 18 (e.g., charge time remaining, present voltage level, etc.) so that the controller 18 can determine whether to pulse—and for how long to pulse—the associated heat trace 14 with voltage so that the energy storage device can store more energy. The energy storage data reports sent by the sensor module 24 with the same periodicity as the sensed temperature reports; that is, the reports could include both the sensed temperature and the storage level of the energy storage device. In various embodiments, the controller 18 can dynamically scale the frequency of the reports to optimize energy consumption.

In various embodiments, a 100 mA charge rate would take 250 seconds to charge a 25 F supercapacitor from 0 VDC to 1 VDC, and a charge from 1 VDC to 2.5 VDC would require an additional 375 seconds. A full discharge cycle of the supercapacitor 100 from 2.5 VDC to 1 VDC would allow approximately 1300 minutes of operation for the sensor module 24, assuming 0.050 J per report from the sensor module 24 to the temperature control system 16 with a report every minute.

Such momentary increases in power will not ordinarily have other deleterious effects on the system as the rate of change of the temperature of the material in an insulated pipe is relatively slow and it is not required for the temperature control system 16 to continuously know the temperature of the pipe. Further, since the heat traces only provide thermal maintenance (e.g., offset heat losses) and do not heat the material in the pipe, the system thermal dynamics are slow. Therefore, momentary increases in power will not significantly affect the material in the pipe 12.

Figure 7:
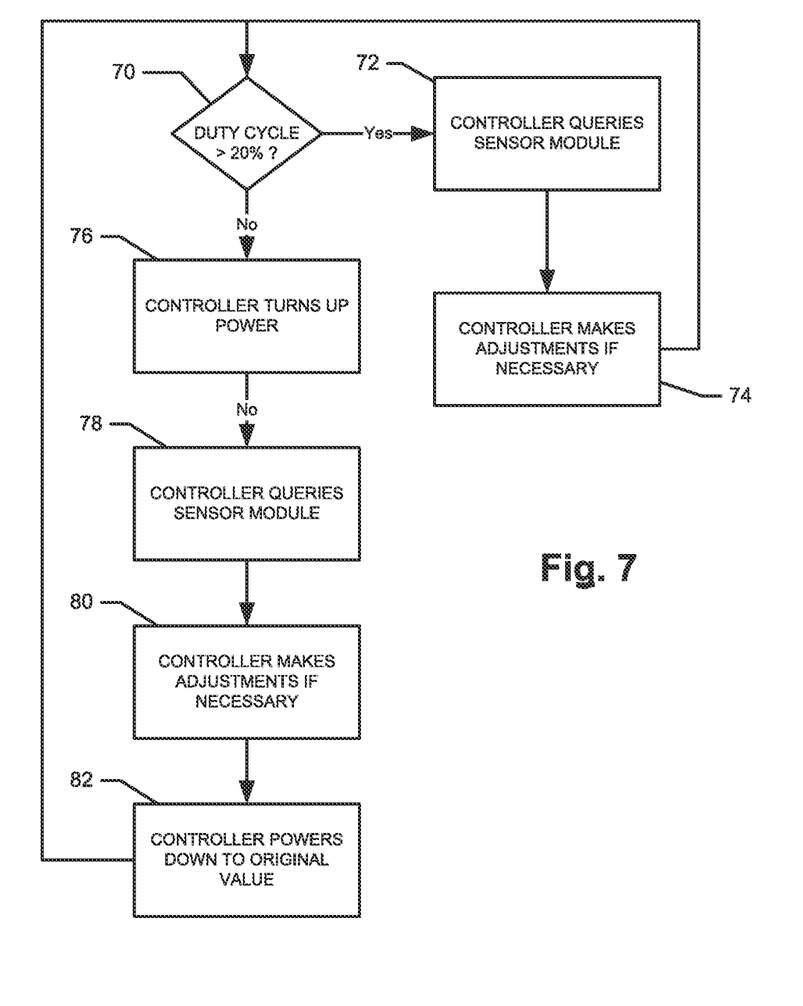
FIG. 7 diagrams a process flow of the controller according to various embodiments of the present invention.

FIG. 7 illustrates a process that the controller 18 may execute when communicating with one of the sensor modules 24 in another embodiment of the present invention. This embodiment may be used where the sensor module 24 does not include an energy storage device and the controller 18 needs to power up the heat traces to power up their associated sensor module. First, at step 70, the controller 18 checks the voltage on the loop of the sensor module 24. This may be done by checking the duty cycle of the regulator 22 for the loop. If the duty cycle is above some threshold where there is sufficient power to keep the sensor module 24 on (e.g., 20% as shown in the example of FIG. 7), at step 72 the controller 18 can query the sensor module 24 for its temperature reading and, at step 74, control the regulator 22 for the loop based on the temperature data received from the sensor module (e.g., turn up or down the duty of the SCRs of the regulator 22 depending on whether the temperature is too low or too high compared to a specified set point). The appropriate threshold for step 70 of course will depend on the power requirements for the sensor module 24 and the available power from the power source 20. From there the process can loop back to step 70 for the next time the controller 18 needs to query the sensor module 24.

On the other hand, if at step 70 the duty cycle is below the threshold, there is presumptively insufficient power for the sensor module 24. Therefore, at step 76, the controller 18 turns up the power for the loop (e.g., increases the duty cycle of the SCRs) for a brief period of time to a level that is sufficient to power on the sensor module 24. Once powered on, at step 78 the controller 18 queries the sensor module 24 for its current temperature status and, at step 80, controls the regulator 22 for the loop based on the temperature data received from the sensor module 24. Then at step 82 it can return the power level of the loop to its original level (e.g., the level it was at before it was raised at step 76) and return back to step 70 again. The length of time for steps 76 to 82 in FIG. 7 should be as brief as practical, yet long enough to power up the sensor module 24, obtain and report back the temperature data. For a wireless installation, depending on the number of sensor modules 24 and the geographic size of the layout, it may take several minutes for the mesh network to reestablish itself so that the temperature data can be reported back to the controller 18. The temperature control system 16 may have the capacity to control a finite number of heat trace loops, such as up to thirty six. If a piping installation requires additional heat trace loops, additional temperature control systems 16 may be used. Also, the components of a single temperature control system 16 may be embodied in a single control unit or panel, or the various components may be distributed across multiple, discrete, distributed control units or panels.

In various embodiments, the modules 24 may also be used to verify whether there is a break or otherwise diminished voltage connection between a heat trace 14 and its associated regulator 22, such as because of a break or loose connection in the heat trace wiring. In such an embodiment, a sensor module 24 may include a voltage sensor for sensing the voltage fed into its energy storage device 100 from the heat trace 14. The sensor module 24 can report this voltage back to the controller 18 so that the controller 18 can compare that voltage to the expected voltage from the heat trace's associated regulator 22. If the difference exceeds a threshold, the controller 18 determines that there is a comprised electrical connection to the heat trace 14 and reports an alarm.

In various embodiments, therefore, the present invention is directed to a heat trace system 10 for heating vessels 12 of a piping system. The heat trace system 10 comprises a temperature control system 16 that comprises a programmable, microprocessor-based controller 18 and a power source 20. The heat trace system 10 also comprises a plurality of heat trace elements 14 that are adjacent to the vessels 12 of the piping system. The plurality of heat trace elements 14 are connected to the power source 20 of the temperature control system 16. The heat trace system 10 also comprises a plurality of sensor modules 24 distributed throughout the piping system. The sensor modules comprise a temperature sensor, and they are connected to, and powered by, the plurality of heat trace elements. In addition, the sensor modules are configured to transmit sensed temperature data for the vessels to the temperature control system.

In various implementations, the sensor modules transmit the sensed temperature data to the central computer system via a wireless network (e.g., a mesh wireless network) or via wired data link. The controller uses the temperature data to control the power supplied to the heat trace elements to thereby control the heating of the pipes. In various implementations, the sensor modules comprise an energy storage device, such as a supercapacitor 100, that stores energy from the voltage difference across the buss wires of the heat trace element. That storage energy can be used to power the components of the sensor module, even when no current is flowing in the heat trace element. The sensor module may report back to the controller the status of the energy storage device (e.g., remaining charge) so that the controller can momentarily increase the power to the heat trace element, to thereby increase the energy storage level of the energy storage device.

At least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components.

Moreover, the processes associated with the present embodiments may be executed by programmable equipment, such as computers or computer systems. Software that may cause programmable equipment to execute processes may be stored in any storage device, such as, for example, a computer system (nonvolatile) memory, RAM, ROM, Flash Memory, etc.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. For example, certain steps shown in FIG. 7 could be performed in different order than shown. The disclosed embodiments are therefore intended to include all such modifications, alterations, and adaptations without departing from the scope of the embodiments as set forth herein.

What is claimed is:

1. A heat trace system for heating vessels of a piping system, the heat trace system comprising:
   a temperature control system comprising:
      a programmable controller comprising at least one microprocessor; and
      a power source connected to the controller;
   a plurality of heat trace elements that are adjacent to vessels of the piping system, and wherein the plurality of heat trace elements are connected to the power source of the temperature control system; and
   a plurality of temperature sensor modules distributed throughout the piping system, wherein:
      the plurality of temperature sensor modules are connected to and powered by an associated heat trace element of the plurality of heat trace elements;
      each of the temperature sensor module comprises:
         a temperature sensor for sensing a temperature of a localized point of a vessel of the piping system; and
         an energy storage device connected to the associated heat trace element for storing energy from the associated heat trace element, wherein the energy stored by energy storage device from the associated heat trace element is for powering the temperature sensor of the temperature sensor module; and
      the plurality of temperature sensor modules are configured to transmit sensed temperature data, sensed by the temperature sensors, to the temperature control system.

2. The heat trace system of claim 1, wherein the temperature sensors comprise resistance temperature detectors.

3. The heat trace system of claim 1, wherein one or more of the temperature sensor modules comprise a RF module for wirelessly transmitting the sensed temperature data to the temperature control system.

4. The heat trace system of claim 3, wherein the RF module wireless transmits the sensed temperature data via a wireless mesh network.

5. The heat trace system of claim 4, wherein the RF module wirelessly transmits data using the IEEE 802.15.4 standard.

6. The heat trace system of claim 1, wherein each of the temperature sensor modules comprises:
   a microcontroller connected to the temperature sensor; and
   wherein the energy storage device is for powering the microcontroller and the temperature sensor.

7. The heat trace system of claim 6, wherein each temperature sensor module further comprises a RF module for wirelessly transmitting the sensed temperature data to the temperature control system, and wherein the energy storage device of the temperature sensor module is connected to and powers the RF module.

8. The heat trace system of claim 7, wherein the energy storage device comprises a supercapacitor.

9. The heat trace system of claim 8, wherein:
the power source of the temperature control system comprises a plurality of voltage regulators; and
each of the heat trace elements is connected to one of the voltage regulators.

10. The heat trace system of claim 9, wherein the plurality of voltage regulators comprise a plurality silicon-controlled rectifiers.

11. The heat trace system of claim 9, wherein the at least one microprocessor of the programmable controller is programmed to:
compare the transmitted temperature data to desired set point temperatures for the heat traces; and
control duty cycles of the voltage regulators based on the comparisons.

12. The heat trace system of claim 11, wherein the sensor modules are configured to transmit a storage level of their energy storage device to the temperature control system.

13. The heat trace system of claim 12, wherein:
the temperature sensors comprise resistance temperature detectors; and
one or more of the temperature sensor modules comprise a RF module for wirelessly transmitting the sensed temperature data to the temperature control system.

14. The heat trace system of claim 12, wherein:
each temperature sensor module reports a voltage fed to the energy storage device of the temperature sensor module from the temperature sensor module's associated heat trace; and
the programmable controller compares the voltage to an expected voltage to determine whether there is a compromised electrical connection between the voltage regulator for the heat trace and the heat trace.

15. The heat trace system of claim 14, wherein each temperature sensor module comprises a voltage sensor for sensing the voltage fed to the energy storage device of the temperature sensor module from the temperature sensor module's associated heat trace.

16. A reporting method for a heat trace system that heats vessels of a piping system, wherein the heat trace system comprises:
a temperature control system comprising:
a programmable controller comprising at least one microprocessor; and
a power source connected to the controller;
a plurality of heat trace elements that are adjacent to vessels of the piping system, and wherein the plurality of heat trace elements are connected to the power source of the temperature control system; and
a plurality of temperature sensor modules distributed throughout the piping system, wherein each of the temperature sensor module comprises a temperature sensor for sensing a temperature of a localized point of a vessel of the piping system, the method comprising:
storing energy, by each sensor module, in an energy storage device, for a voltage different across an associated heat trace element of the plurality of heat trace elements;
powering each sensor module with the stored energy from the energy storage devices; and
transmitting, by the plurality of temperature sensor modules, sensed temperature data, sensed by the temperature sensors, to the temperature control system.

17. The method of claim 16, further comprising:
sensing, with a voltage sensor of at least one temperature sensor module, a voltage fed to the energy storage device of the at least one temperature sensor module from the at least one temperature sensor module's associated heat trace;
reporting, by the at least one temperature sensor module, the sensed voltage fed to the energy storage device of the at least one temperature sensor module from the at least one temperature sensor module's associated heat trace; and
comparing, by the programmable controller of the temperature control system, the sensed voltage fed to the energy storage device to an expected voltage to determine whether there is a compromised electrical connection between the voltage regulator for the heat trace and the heat trace.

18. The method of claim 16, wherein the energy storage devices comprise supercapacitors.

19. The method of claim 18, wherein:
the power source of the temperature control system comprises a plurality of voltage regulators; and
each of the heat trace elements is connected to one of the voltage regulators.

20. The method of claim 19, wherein the plurality of voltage regulators comprise a plurality silicon-controlled rectifiers.

21. The method of claim 19, further comprising:
comparing, by the temperature control system, the transmitted temperature data to desired set point temperatures for the heat traces; and
controlling, by the temperature control system, duty cycles of the voltage regulators based on the comparisons.

22. The method of claim 21, further comprising transmitting by the sensor modules a storage level of their energy storage device to the temperature control system.

* * * * *